United States Patent [19]

Heller

[11] 4,178,074
[45] Dec. 11, 1979

[54] HEAD-UP DISPLAYS

[75] Inventor: Fritz P. Heller, Bromley, England

[73] Assignee: Elliott Brothers (London) Limited, Chelmsford, England

[21] Appl. No.: 887,071

[22] Filed: Mar. 16, 1978

[30] Foreign Application Priority Data

Mar. 28, 1977 [GB] United Kingdom ............... 12926/77

[51] Int. Cl.² ........................................... G02B 27/14
[52] U.S. Cl. .................................... 350/171; 350/174; 358/55
[58] Field of Search ................ 350/171, 288, 174; 358/55

[56] References Cited

U.S. PATENT DOCUMENTS 3,840,289  10/1974  Day ........................................ 350/174
4,081,209  3/1978  Heller et al. ......................... 350/174

FOREIGN PATENT DOCUMENTS 1275090  11/1970  United Kingdom .................... 350/174

Primary Examiner—John K. Corbin
Assistant Examiner—B. Wm. de los Reyes
Attorney, Agent, or Firm—Kirschstein, Kirschstein, Ottinger & Cobrin

[57] ABSTRACT

A head-up display optical projector using a Petzval type collimating optical system wherein a secondary image is injected through an optically flat peripheral surface of a lens included in the Petzval lens group closer to the main image display surface of the projector, the lens incorporating an interior flat dichroic film for combining the main and secondary images.

5 Claims, 4 Drawing Figures

HEAD-UP DISPLAYS

This invention relates to optical projectors for display units of head-up display systems.

Optical projectors as aforementioned conventionally utilize a collimating optical system of the Petzval type, i.e. a system comprising two spaced apart groups of active optical elements. Commonly, indeed usually, an optically flat reflector is interposed between the two spaced apart groups of active optical elements for the purpose of bending through 90° the optical path of light transmitted from an optical display surface, e.g. the screen of a cathode ray tube, located in the focal plane of the optical system.

Not infrequently there is a need for a second optical display surface, for example for a standby sight arrangement, to be included in the projector. A number of designs of this kind exist, some injecting the standby sight image from one side, some in two halves from both sides, some using a graticule fixed in space, others a graticule moved up and down through a mechanical drive to control the "depression" of the aiming point, some illuminating the graticule by a lamp directly or through a fibre optic bundle, and some using light emitting diodes for this purpose.

In known projectors the provision of such a standby sight arrangement extends the optical path length of the projector with consequent limitation of the optical performance of the projector.

It is an object of the present invention to provide an optical projector for a head-up display system wherein this difficulty is overcome.

According to the present invention an optical projector for the display unit of a head-up display system comprises: a first optical display surface; a first collimating optical system for light from the said display surface, the said optical system being of the Petzval type and including in that lens group which is the closer to the said display surface a lens having an optically flat peripheral surface and an interior flat dichroic film which is transmissive to light from the said display surface; a second optical display surface laterally disposed with respect to the said lens and parallel to the said flat peripheral surface; and, between the second display surface and said flat peripheral surface, an optical arrangement which, with the said lens and those optical elements downstream from the said lens, forms a collimating optical system for light from the second display surface reflected by the dichroic film.

One optical projector in accordance with the invention will now be described by way of example with reference to the accompanying drawings in which.

Figure 1:
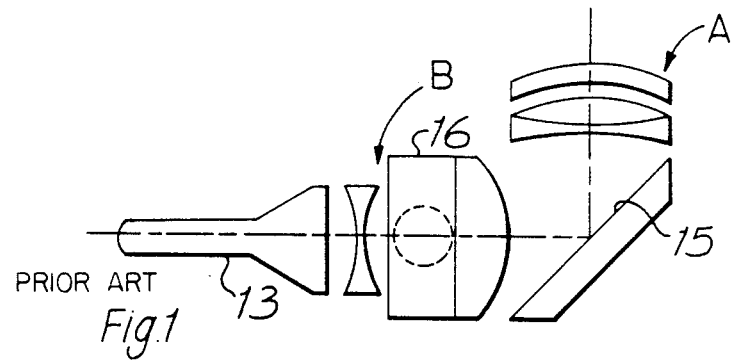
FIG. 1 shows in elevation a schematic diagram of the optical elements of a typical prior art optical projector for a display unit of a head-up display system.
Figure 2:
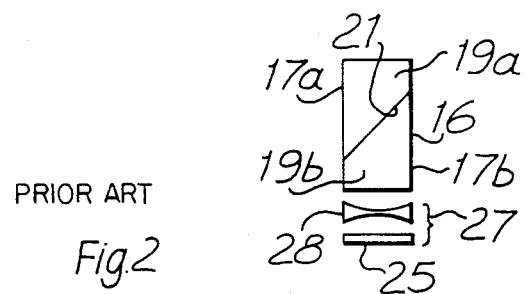
FIG. 2 shows in plan a schematic diagram of a beam splitter used in the projector of FIG. 1.

Referring to FIG. 1, in the typical prior art optical projector there is a Petzval optical system comprising two groups of optical elements A and B. The optical system collimates light from optical data presented at the screen 11 of a cathode ray tube 13. Between the groups A and B of optical elements there is a reflector 15.

Light from the optical system is incident on an optical combiner (not shown), i.e. a beam splitter, on the forward line of sight of the observer to the distant scene. The observer thus sees the optical data presented on the screen 11 superimposed on his view of the distant scene through the combiner.

The group of optical elements B of the Petzval system includes a further beam splitter 16. The beam splitter 16 is in the form of a block of glass having optically flat and parallel major surfaces 17a, 17b.

The block is formed from two parts 19a, 19b bonded together with a film of dichroic material 21 at their interface which is transmissive to light in a certain waveband characteristic of the cathode ray tube screen phosphor.

Laterally located with respect to the beam splitter 16 there is a standby sight 27. This comprises a planar, optical display element 25 and, between the element 25 and the beam splitter 16, a lens arrangement 28. Light from the display element 25 is, unlike light from the cathode ray tube screen 11, reflected at the dichroic film 21 of the beam splitter 16. As remarked earlier, the display element 25 may, for example, be a graticule, movable or stationary, illuminated by a lamp directly, or through a fibre optic bundle, or by an array of light emissive diodes.

The position and size of the beam splitter 16 is determined by the angular size of the standby image to be injected and the range of eye positions from which it is required to be visible.

The presence of the beam splitter 16 constitutes a limitation to the optical design. It makes the optics longer, increases the f-number and in consequence the size of the cathode ray tube screen 11 required for a given angular size image presented to the observer, and reduces the maximum field of view visible without vignetting. In an arrangement in accordance with the present invention this limitation is avoided.

Figure 3:
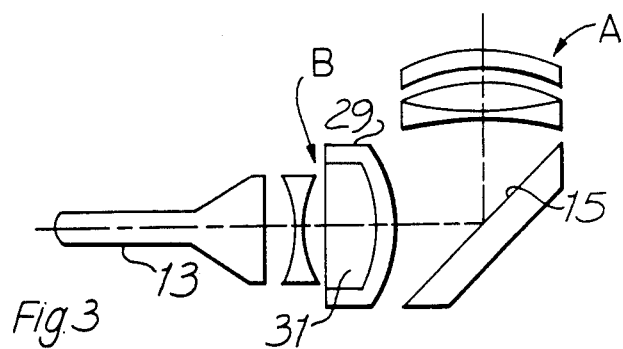
FIG. 3 shows in elevation a schematic diagram of an optical projector in accordance with the invention; and, FIG. 4 shows, schematically, in plan, a beam splitter lens used in the projector of FIG. 3.
Figure 4:
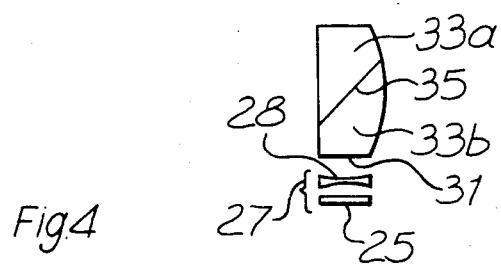

Referring now to FIGS. 3 and 4 in the optical projector in accordance with the invention to be described by way of example the beam splitter 16 is absent. The optical system is accordingly shorter and more efficient in magnifying the image on the cathode ray tube screen 11. The required beam splitter is now incorporated in a lens 29 of the lens group B of the Petzval system.

To this end the lens 29 is cropped at one side so as to form an optically flat surface 31, and the lens 29 is formed as two parts 33a and 33b bonded together by an optical cement of matching refractive index and provided at the interface with a dichroic film 35. The film 35 is typically inclined to the optical axis of the Petzval optical system at an angle in the range 45° to 50°.

It will be appreciated that the dimension of the lens 29 in a direction parallel to the optical axis is necessarily somewhat restricted. However, while it is usually required that a standby sight covers most of the vertical extension of the observer's field of view a comparatively small extension in the horizontal direction is often acceptable. The sight may, for example, be in the form of a vertical line with short horizontal marks at ten or twenty milliradian intervals. Hence, the above-mentioned restriction is rarely a disadvantage in standby sight applications of the invention.

I claim:

1. An optical projector for the display unit of a head-up display system comprising:

(A) a first optical display surface;
(B) a first collimating optical system for light from said first display surface, the said first optical display system being of the Petzval type and including
 (i) a first lens group and
 (ii) a second lens group,
 (iii) said first lens group being closer to the first display surface than the second lens group,
(C) the first lens group including a lens having a optically flat peripheral surface,
 (i) said lens having a first surface proximal to said first display surface and
 (ii) a second surface distal to said first display surface,
 (iii) said first and second lens surfaces being transverse to the optical axis of the first lens group,
 (iv) said distal lens surfaces being curved, and
(D) an interior flat dichroic film which is transmissive to light from said first display surface and which extends at an angle to the optical axis of the first lens group from said second surface to and reaches said first surface;
(E) a second optical display surface laterally displaced with respect to the said lens and parallel to the said flat peripheral surface, and
(F) between the second display surface and said flat peripheral surface, an optical arrangement which, with the curved distal surface of said lens and those optical elements down stream from the said lens, forms a collimating optical system for light from the second display surface reflected by the dichroic film.

2. An optical projector according to claim 1 wherein said lens is formed as two parts bonded together, said dichroic film being at the interface between the two parts.

3. An optical projector according to claim 1 wherein said film is inclined to the optical axis of the Petzval optical system at an angle in the range 45° to 50°.

4. An optical projector according to claim 1 wherein said second optical display surface is adapted to inject a standby sight image into the projector output.

5. A display unit for a head-up display system incorporating an optical projector according to claim 1.

* * * * *